(12) United States Patent
Attwell et al.

(10) Patent No.: US 9,454,553 B2
(45) Date of Patent: *Sep. 27, 2016

(54) MULTI-SHOT SCHEDULING SYSTEM

(71) Applicant: Clear Channel Management Services, Inc., San Antonio, TX (US)

(72) Inventors: Nigel Attwell, Goldens Bridge, NY (US); Chris Bean, Alexandria (AU)

(73) Assignee: IHEARTMEDIA MANAGEMENT SERVICES, INC., San Antonio, TX (US)

( * ) Notice: Subject to any disclaimer, the term of this patent is extended or adjusted under 35 U.S.C. 154(b) by 185 days.

This patent is subject to a terminal disclaimer.

(21) Appl. No.: 14/267,022

(22) Filed: May 1, 2014

(65) Prior Publication Data

US 2014/0244655 A1 Aug. 28, 2014

Related U.S. Application Data

(63) Continuation of application No. 13/268,267, filed on Oct. 7, 2011, now Pat. No. 8,751,497.

(51) Int. Cl.
*G06F 17/30* (2006.01)
*H04H 60/06* (2008.01)
*H04N 21/262* (2011.01)
*H04N 21/84* (2011.01)
*H04H 60/47* (2008.01)

(52) U.S. Cl.
CPC ..... *G06F 17/30321* (2013.01); *G06F 17/3053* (2013.01); *H04H 60/06* (2013.01); *H04N 21/26258* (2013.01); *H04N 21/84* (2013.01); *H04H 60/47* (2013.01)

(58) Field of Classification Search
CPC ............ G06F 17/30321; H04N 60/06; H04N 21/26258; H04N 21/84
USPC ................................. 707/741, 737, 749, 916
See application file for complete search history.

(56) References Cited

U.S. PATENT DOCUMENTS

| | | | |
|---|---|---|---|
| 6,910,220 B2 | 6/2005 | Hickey et al. | |
| 8,751,497 B2 * | 6/2014 | Attwell | H04H 60/06 707/737 |
| 2006/0195462 A1 | 8/2006 | Rogers | |
| 2008/0147640 A1 | 6/2008 | Schachter | |
| 2009/0055759 A1 | 2/2009 | Svendsen | |
| 2010/0094934 A1 | 4/2010 | Svendsen et al. | |

* cited by examiner

*Primary Examiner* — Vincent Boccio
(74) *Attorney, Agent, or Firm* — Garlick & Markison; Edward Marshall

(57) ABSTRACT

A Multi-Shot Scheduling System chooses from multiple candidate playlists of positions to select a broadcast playlist. Candidate playlists are generated based upon scoring and selecting content items for the positions through the use of index values. Various embodiments of the Multi-Shot Scheduling System can select broadcast playlists for multiple groups of content and can provide different methods of controlling scheduling performance by restricting the range of candidate playlists from which the best playlist can be selected.

20 Claims, 7 Drawing Sheets

MULTI-SHOT SCHEDULING SYSTEM

The present U.S. Utility patent application claims priority pursuant to 35 U.S.C. §120, as a continuation of U.S. Utility patent application Ser. No. 13/268,267, entitled, "MULTI-SHOT SCHEDULING SYSTEM," filed Oct. 7, 2011, which is hereby incorporated herein by reference in its entirety and made part of the present U.S. Utility patent application for all purposes.

DESCRIPTION

1. Field

The present disclosure relates in general to information technology in the field of media broadcasting, and more particularly to content scheduling.

2. Background

Current media broadcasting technology allows content items, such as programs, videos, advertisements or some other type of multimedia, to be scheduled for broadcast, display, transmission, or the like.

In some instances, current technology can schedule a broadcast daypart by selecting content items for time-slots ("positions") in the daypart. The selection of content items for each position may be determined by some property of one content item, relative to the properties of other content items.

Because currently available technology schedules content items individually, however, the selection decision of content scheduled earlier can negatively impact the results when selecting content that are scheduled later. For this and other reasons, currently available technology is less than ideal.

SUMMARY

In one aspect of the disclosure, processing circuitry is used to generate multiple candidate playlists and select one of the candidate playlists. Each candidate playlist can be generated by selecting a content item to be assigned to each position of the candidate playlist. Each position can be associated with a category group (also referred to herein as a "group of content items"), including, but not limited to, a particular content type. Selection of content items can be based on both a position index value assigned to each position and a score associated with assignment of each content item to each position.

A list of content items ranked by their individual scores can be assembled and a content item having a content item index value matching the position index value assigned to the position can be selected. Each score can be determined based on a demand-based goal-driven scheduling algorithm, and each position index value can be less than a predetermined maximum. In some embodiments, the predetermined maximum can be determined based on processing time. One of the candidate playlists can be selected by determining, for each candidate playlist, an aggregate score of the content items assigned to each position, and selecting the candidate playlist based on the aggregate score. In some embodiments, multiple candidate playlists are generated, and with particular candidate playlists being discarded prior to generation of the next candidate playlist in response to the discarded playlist's aggregate score being less than the aggregate score of a previously-generated candidate playlist.

In another aspect of the disclosure, a device includes processing circuitry and a memory operably associated with the processing circuitry that can generate multiple candidate playlists and select one of the candidate playlists. The processing circuitry and memory can also discard a candidate playlist, prior to generating a next candidate playlist, in response to the candidate playlist having a lesser aggregate score than a previously-generated candidate playlist. The processing circuitry and memory can select a content item for assignment to each position of each candidate playlist by assembling a list of the content items ranked by the score associated with assignment of each content item to the position of the candidate playlist and selecting a content item having a content item index value matching the position index value assigned to the position.

In yet other aspects of the disclosure, processing circuitry is used to generate a multi-shot sequence including one or more position index values to assign to a candidate playlist. Each position index value can be assigned to a position of the candidate playlist and each position can be scheduled with a content item based at least in part on the position index value assigned to the position. Such a basis can include the content item having a content item index value that matches the position index value assigned to the position. Position index values can be restricted to a predetermined range of values. The number of position index values in the multi-shot sequence outside a predetermined range of values can be restricted to a predetermined maximum. Position index values exceeding a predetermined value can be assigned to one or more restricted positions of each candidate playlist. The sum of all position index values in a multi-shot sequence can be less than a maximum value.

BRIEF DESCRIPTION OF THE DRAWINGS

Aspects of this disclosure will become apparent upon reading the following detailed description and upon reference to the accompanying drawings, in which like references may indicate similar elements.

DETAILED DESCRIPTION

Figure 1:
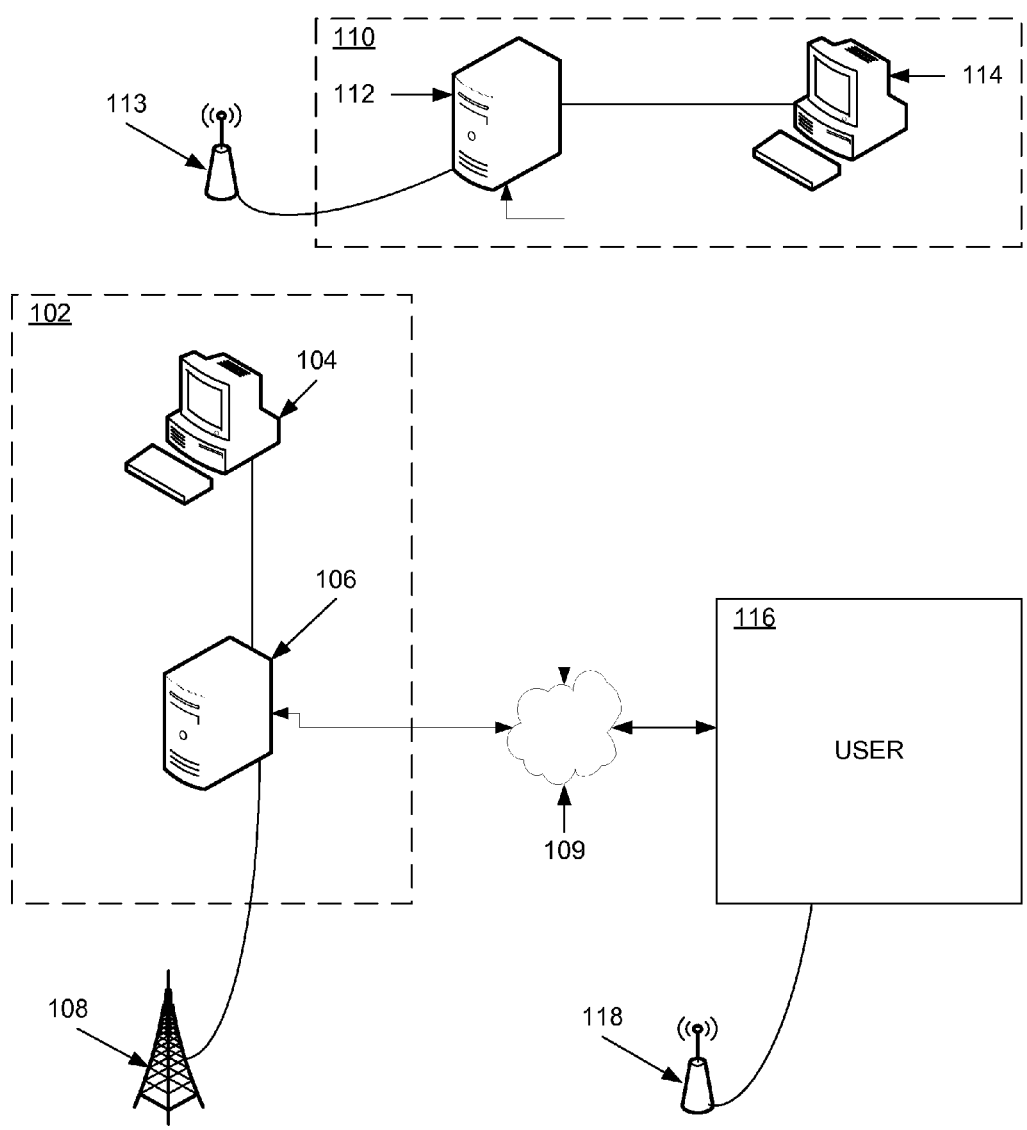
FIG. 1 is a diagram illustrating broadcast system according to various embodiments of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

The detailed description is provided primarily in the context of radio broadcasting, but those skilled in the art will appreciate that the disclosure is not limited to radio broadcast operations and can include television broadcast operations, Internet transmissions, or any media broadcast operations.

A Multi-Shot Scheduling System according to various embodiments can be used to schedule a broadcast playlist by generating and comparing multiple Shots (also referred to herein as "candidate playlists") in order to select a candidate playlist as the broadcast playlist. Playlists can include a sequence of one or more timeslots (also referred to herein as "positions"), into which one or more content items are scheduled (also referred to herein as "assigned"). The broadcast playlist can be presented by various methods including, but not limited to, broadcast, transmission, display, or the like. Presentation of a playlist, and the content items assigned in positions therein, is referred to herein as "performance". In some embodiments, a user may utilize the Multi-Shot Scheduling System via a broadcast station, transmission station, server, computing device, processing system, end-user device, or the like.

The Multi-Shot Scheduling System can include generating multiple candidate playlists by selecting content items to assign to each position of each candidate playlist based upon content item scores and index values. In some embodiments, candidate playlists may feature the same layout required for the broadcast playlist so that any one of the candidate playlists can be selected as the broadcast playlist. For example, where a broadcast playlist has three positions, each candidate playlist may also have three positions. In some embodiments, a broadcast playlist may include a certain number of positions that are associated with a category group. For example, a broadcast playlist may include three positions that are associated with upbeat music. Such positions may only be assigned content items that are also associated with upbeat music.

The Multi-Shot Scheduling System, in some embodiments, utilizes Multi-Shot sequences to generate the candidate playlists. A Multi-Shot sequence may comprise one or more index values. In some embodiments, each index value may be represented by one or more symbols including, but not limited to, one or more alphanumeric characters, and may be generated at random or according to some logic. For example, where index values are numerical zero-based characters (i.e., numerical characters ordered from "0"), a Multi-Shot sequence may include a sequence of index values having a positive numerical value ascending from "0". In some embodiments, index values are "based" upon some other symbol. For example, index values may be seven-based (i.e., numerical characters ordered from "7"), beta-based (i.e., alphabetical characters ordered from "B"), or the like. In some embodiments, index values may represent a content item's relative ranking by score in relation to all other scored content items; such index values may be referred to herein as content item index values. For example, where index values are numerical zero-based characters, a content item index value of "0" may correspond to a scored content item that has a better score than any other scored content item (the "best-scoring" content item), a content item index value of "1" may correspond to the scored content item that has a better score than any other scored content item except the best-scoring content item, and so forth.

In some embodiments, the number of index values in a Multi-Shot sequence may correspond to the number of positions of the broadcast playlist; such index values may be referred to herein as "position index values". Each position index value may correspond to an individual position. For example, where a broadcast playlist must have three positions, each Multi-Shot sequence generated as part of selecting the broadcast playlist in the Multi-Shot Scheduling may have three position index values, each position index value corresponding to one of the three positions. In some embodiments, the position index values in each Multi-Shot sequence cannot exceed a maximum value. For example, where the index values are numerical zero-based characters, a maximum index value may be "1", so that no position index value in any Multi-Shot sequence can be greater than 1. In some embodiments, the maximum index value limitation and the number of positions required for the broadcast playlist may determine the number of Multi-Shot sequences to be generated, and the number of position index values in each Multi-Shot sequence. For example, where a broadcast playlist must include three positions, and no position index value in a Multi-Shot sequence can exceed a value of "1", eight unique Multi-Shot sequences may be generated, each Multi-Shot sequence including a unique sequence of three position index values each having a value of "0" or "1". The number of Multi-Shot sequences may also be determined, in some embodiments, by the function $(N+1)^k$, where "N" is the maximum position index value and "k" is the number of positions required for the broadcast playlist.

In some embodiments, the Multi-Shot Scheduling System uses restriction rules to restrict the overall number of candidate playlists; as a result, the amount of time necessary to select a broadcast playlist may be reduced. One restriction rule may restrict the maximum position index value that may be assigned to any candidate playlist. For example, where a broadcast playlist must have three positions and a restriction rule sets the maximum zero-based position index value to "1", the number of candidate playlists is 8. In some embodiments, the maximum position index value may be determined based on one or more various factors. For example, the maximum position index value may be determined based upon the likely time required to generate candidate playlists for all Multi-Sequences (hereinafter referred to as "processing time"), the probability that a broadcast playlist will be selected from candidate playlists having a position index value greater than a given value, or some other factors or combination thereof. In addition, where a broadcast playlist must have three positions and a restriction rule sets the maximum zero-based position index value to "2", the number of candidate playlists is 27. Another restriction rule may set the maximum sum of all position index values assigned to all positions in an individual candidate playlist. For example, where the broadcast playlist must have three positions and the maximum sum is 1 for zero-based position index values, the number of candidate playlists will be 4 (the maximum number of combinations of "1" and "0" in three positions with a sum less than 2). Also, a restriction rule may set the maximum number of positions in the candidate playlist which may be assigned a position index value other than a predetermined range of values. For example, the restriction rule may set the maximum number of positions in a candidate playlist that may be assigned a zero-based position index value greater than "1" as "1", thereby indicating that a Multi-shot sequence include no more than one position index value of "2" or greater. Furthermore, a restriction rule may set which positions may be assigned index values exceeding a predetermined value, or falling outside a predetermined range of values. For example, the restriction rule may specify that position index values with a value greater than "1" may be assigned to the third position of a candidate playlist, but not the first or second positions.

In some embodiments, candidates for the broadcast playlist may be generated such that there is a candidate playlist for each Multi-Shot sequence. For example, where there are eight Multi-Shot sequences, eight candidate playlists may be generated, and one Multi-Shot sequence may be assigned to each candidate playlist. As a result, each position of each candidate playlist may have an assigned position index value from a Multi-Shot sequence.

In some embodiments, generating a candidate playlist includes selecting content items to assign to each position of the candidate playlist. Selecting a content item to assign to a particular position can include scoring content items with regard to the position. For example, for a given position of a given candidate playlist, all content items may be tested and scored based on an algorithm that measures one or more factors, some or all of which may be user-defined. For example, the algorithm may be a demand-based goal-driven algorithm which scores each content item based upon how well the content item conforms to a predetermined set of factors. Factors in a demand-based goal-driven algorithm may include Rules and Goals. For example, a Rule might state that a content item cannot play in a particular hour of the day, in which case, the content item would yield a low score when scored for a position which falls in that particular hour of the day. Alternatively, and not by way of limitation, a Goal might specify that assigning content items created by a specific artist should be separated by a certain time period. Violations of this Goal might yield progressively lower scores as content items which are created by this artist are scored in progressively chronologically proximate positions. Furthermore, a Goal might specify that, where a specific content item is assigned to two separate positions in a daypart, the positions should be separated by a certain time period. Violations of this goal might yield progressively lower scores as this content item is scored in progressively chronologically proximate positions. Consequently, scores of content items for a position are influenced by what content items may have been assigned to previous positions and any rules which may apply to the specific position. The demand-based goal-driven algorithm is disclosed in U.S. Pat. No. 6,910,220, "Demand-Based Goal-Driven Scheduling System", and is hereby incorporated by reference in its entirety herein for all purposes. In some embodiments, only certain content items may be considered for assignment to positions of candidate playlists. For example, where a position is associated with a particular group of content items, only content items that are associated with the same group of content items, referred to herein as "eligible content items", may be tested and scored. Such association may be present as a dedicated metadata indicator that identifies one or more content item's association with one or more specific category groups, or the like, or it may be inferred from other metadata, such as content item artist, music genre, subgenre, year of creation, or the like.

Once content items are tested and scored, each scored content item may be assigned a content item index value corresponding to the score of the content item. For example, as discussed above, a content item with the highest score of all scored content items may be assigned a content item index value of "0", the second-highest scoring content item may be assigned a content item index value of "1", and so on. The scored content items may, in some embodiments, be organized into a list of scored content items ordered or ranked by each content item's score, where each position in the list is assigned a unique content item index value.

In some embodiments, selecting a content item to be assigned to a given position in a given candidate playlist may include selecting the scored content item that has been assigned a content item index value that matches the position index value assigned to the position by the Multi-Shot sequence. For example, where a given position of a given candidate playlist is assigned a position index value of "1" by a Multi-Shot sequence, and the scored content items are organized into a list that ranks each content item by its score and assigns a corresponding content item index value, the scored content item assigned a content item index value of "1" may be selected to be assigned to the position. In some other embodiments, content item index values may be assigned to content items at random or by some other logic.

In some embodiments, testing, scoring, and selecting content items may be repeated for each position until all positions in a candidate playlist are assigned a content item. For example, content items may be scored, and a particular content item selected, for each position, such that each position is assigned a content item in a particular order. Positions may be assigned content items in a chronological order, with the first position that would be performed by the broadcast playlist being assigned a content item first, and so on. In some other embodiments, positions may be assigned content items in some other order, including, but not limited to, a random order.

In some embodiments, an aggregate score is determined for each candidate playlist. The aggregate score may be determined once all positions in a candidate playlist are assigned a content item, or it may be determined at some other time. An aggregate score may be a function of the individual scores of all of the content items assigned to the positions of the candidate playlist. For example, the aggregate score of a candidate playlist may be the sum of all of the scores of all of the content items assigned to the positions of the candidate playlist. In some other embodiments, the aggregate score may be a function of the individual scores of some of the content items assigned to the positions of the candidate playlist. For example, the aggregate score may be the score of the content item assigned to a specific position or range of positions in each candidate playlist.

The Multi-Shot Scheduling System can select a candidate playlist as the broadcast playlist by comparing the candidate playlists and selecting a candidate playlist which meets certain criteria. For example, the broadcast playlist may be selected as the candidate playlist with the best aggregate score relative to all other candidate playlists generated to meet the requirements of the broadcast playlist. The comparison process may occur at different times in the process of generating candidate playlists. For example, a running best-candidate playlist may be selected after each new candidate playlist is generated, such that, once the last candidate playlist has been generated, the running best-candidate playlist is the selected broadcast playlist. In some embodiments, the comparison and selection process may occur only after all candidate playlists are generated, such that all candidate playlists are compared simultaneously to determine which candidate playlist is to be selected as the broadcast playlist.

In some embodiments, scoring and assignment of content items into positions includes assigning content items to a playlist template. For example, content items may need to be assigned to a position in a particular playlist template in order to be properly tested and scored by an algorithm. Once a candidate playlist has been generated in the particular playlist or playlist template, the candidate playlist may need to be removed before a subsequent candidate playlist can be generated. In some embodiments, the newly-generated candidate playlist may be deleted from the playlist template. In some other embodiments, the newly-generated candidate playlist may simply be overwritten by the next candidate playlist. Information regarding the candidate playlist to be removed, such as which content items are assigned to which positions and the aggregate score, may be saved.

Referring first to the embodiment of FIG. 1, a broadcast station 102 may include workstation 104 which may use broadcast automation software to automate broadcast operations including, but not limited to, scheduling playlists for transmission or broadcast. The workstation 104 may be communicatively coupled to a server 106. In some embodiments, the server 106 may use broadcast automation software to automate broadcast operations, as commanded by workstation 104. In this embodiment, server 106 may be communicatively coupled to antenna 108.

In some embodiments, server 106 may be connected to broadcast server 110, user 116, or the like through a network 109, such as the Internet, a wide-area network, or the like. Such a connection may be direct or indirect, electrical or physical, and may be wired or wireless. In some embodiments, a wireless connection may include one or more of a cellular communication network, a satellite communication network, a Bluetooth connection, or the like. Broadcast servers 106 and 112, along with their respective workstations 104 and 114, may be co-located at a single broadcast station 102 or located apart, and may serve different radio audiences. In one embodiment, as shown in FIG. 1, broadcast servers 106 and 110, along with their respective workstations 104 and 114, may be located apart in separate respective broadcast stations 102 and 110.

In this embodiment, one or more of broadcast servers 106 and 112 and workstations 104 and 114 may be used to store various content items. In addition, one or more of broadcast servers 106 and 112 and workstations 104 and 114 may use the Multi-Shot Scheduling System to generate broadcast playlists for broadcast or transmission. For example, a Multi-Shot Scheduling System located on workstation 104 may utilize content items stored on one or more of broadcast servers 106 and 112 and/or workstations 104 and 114 to generate a broadcast playlist.

Such a broadcast playlist, once generated, may be transmitted to a separate broadcast station 110 or user 116 through network 109, broadcasted through use of antenna 108, or the like. In some embodiments, separate broadcast station 110 can be configured to receive, broadcast, or play a broadcast playlist, content items, Multi-shot sequences, or the like via transceiver 113, which can be communicatively coupled to one or more of server 112 and workstation 114. Transceiver 113 can include, but is not limited to, a wireless transmitter and/or receiver.

In some embodiments, the Multi-Shot Scheduling System may be utilized by a user 116 to generate a broadcast playlist by utilizing content items stored on the user 116 itself, acquired from one or more of broadcast stations 102 and 110, received via transceiver 118, or the like. Broadcast playlists generated by user 116 may be played by user 116, broadcasted by transceiver 118, transmitted via network 109, or the like. User 116 could be a content provider, such as an Internet radio station or a music on demand Web site, or any other Web site that provides media. Alternatively, user 116 could be a consumer or at least one consumer device, including, but not limited to, such devices as computers, appliances, cellular phones, personal digital assistants (PDAs), wrist watches, stand-alone Internet radios, set top boxes, and television systems. The user 116, be it a media provider or consumer device, can be located within a receiver. In addition, the user 116 can be configured to schedule and broadcast or play a broadcast playlist via transceiver 118, which can include, but is not limited to, a wireless transmitter and/or receiver.

Those skilled in the art will recognize that the environment illustrated in FIG. 1 and described herein is not intended to limit the present disclosure. Indeed, those skilled in the art will recognize that other alternative hardware and environments may be used without departing from the scope of the present invention. A server may, for example, include a computer which may include a processor, processing circuitry, processing circuitry programmed by hardware, a random access memory, data storage devices (e.g. hard, floppy, and/or CD-ROM disk, drives, etc.), data communications devices (e.g., modems, network interfaces, etc.), display devices, (e.g., CRT display, LCD display, etc.), and input devices (e.g., mouse pointing devices, keyboard, CD-ROM drive, etc.), one or more components of a processing system, discussed in further detail below in FIG. 6, some combination thereof, or the like. A server may, for example, be attached to other devices, such as a read-only memory, a video card, a bus interface, a printer, etc. A workstation may, for example, include one or more of the above components, one or more components of a processing system, discussed in further detail below in FIG. 6, some combination thereof, or the like. Those skilled in the art will appreciate that any combination of the above components, or any number of different combinations, peripherals, and other devices, may be used with the server. Likewise, those skilled in the art will recognize that various servers, workstations, hardware and software described herein, whether termed "file server," "audio server," "workstation," "first server," "second server," "switcher," "editor," "storage device," "broadcast automation software," "buffer," "adapter," "broadcast station" and the like, and the capabilities and features ascribed thereto, may refer to different functions, programs and/or applications of one or more computing devices in a single location or spread over multiple locations, and may be implemented in hardware, software, virtualized hardware, cloud-based processing, or some combination thereof.

Figure 2:
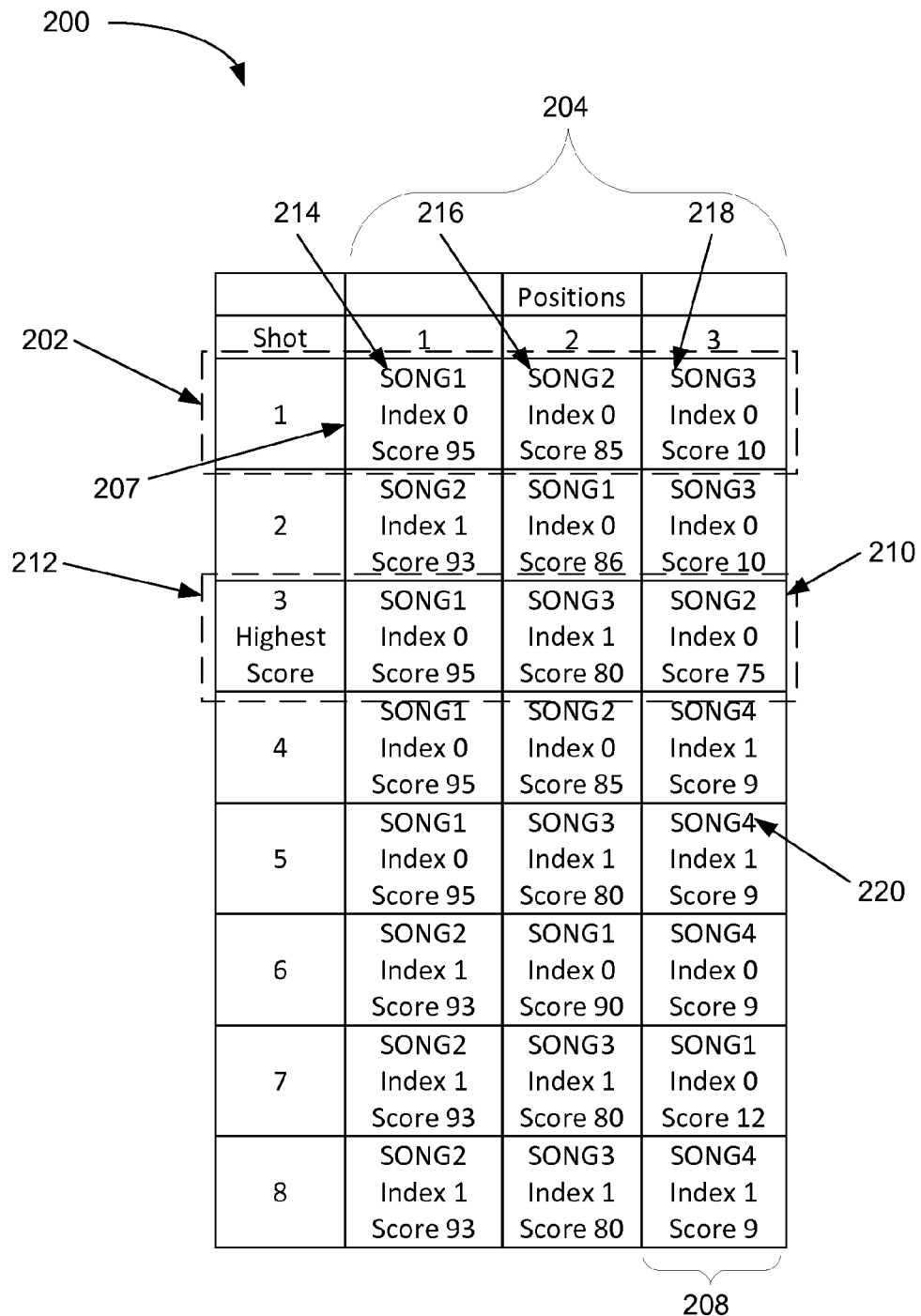
FIG. 2 is a diagram illustrating Multi-Shot Scheduling sequences according to various embodiments of the present disclosure.

Referring now to FIG. 2, a table 200 of candidate playlists (also referred to herein as "Shot sequences" or "shots") is illustrated and discussed. Table 200 illustrates multiple assigned content items 214, 216, 218, and 220 arranged in rows of shots 202. Each shot 202 may include one or more time-slots or "positions" 204, into which content items are assigned. In the illustrated embodiment, for example, each shot 202 may include three positions 204, into each of which one of four possible content items 214, 216, 218, and 220 can be scheduled. As can be seen in FIG. 2, first content item 214 may be SONG1, second content item 216 may be SONG2, third content item 218 may be SONG3, and fourth content item 220 may be SONG4. In some embodiments, content items to be assigned into positions can be received from a device separate from the device utilizing the Multi-Shot Scheduling System, or some or all of the content items can be stored on the same device utilizing the Multi-Shot Scheduling System. In some embodiments, there may be more or less available content items than there are available positions in each shot.

Figure 2A:
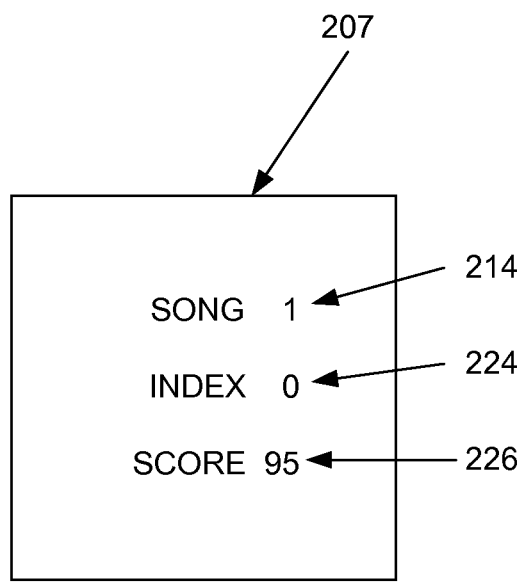
FIG. 2A is a diagram illustrating a candidate playlist position according to various embodiments of the present disclosure.

The first position 207 of the first shot is shown in more detail in FIG. 2A. As can be seen in FIG. 2A, the first position 207 may be assigned a first content item 214. The first content item 214 may be assigned a score 226 of 95. In addition, the first position may be assigned a position index value 224 of 0. In some embodiments, each position in each shot may be assigned a position index value 224. In some embodiments, each position in each shot may be assigned a content item 214 having an associated score 226, a content item 214 having a content item index value that matches the position index value 224, some combination thereof, or the like. In some embodiments, one or more positions in one or more shots may have the same position index value 224. Similarly, one or more content items in one or more shots may have the same score 226 for a given position.

As shown in FIG. 2, each position 204 of each shot 202 may be assigned a position index value. For example, the first, second and third positions of the illustrated third Multi-Shot sequence 212 may be assigned position index values of 0, 1, and 0, respectively. In some embodiments, a Multi-Shot sequence may include a sequence of position index values that are assigned to specific positions in a candidate playlist. For example, the Multi-Shot sequence assigned to shot 212 may include the sequence of position index values 0, 1, and 0 which are assigned to the respective positions 204 of shot 212.

In some embodiments, one or more position index value sequences for each Multi-Shot sequence used to generate a candidate playlist may be unique. For example, as illustrated by table 200, each Multi-Shot sequence of position index values for each candidate playlist or shot may be a unique sequence of position index values where the position index values have a value of either "1" or "0". In some embodiments, additional ranges of position index values may be used in Multi-Shot sequences. For example, in some embodiments, position index values may include a value up to "1000" or higher. In some embodiments, position index values may include one or more alphabetic characters. In some embodiments, position index values may include a combination of one or more numeric values and one or more alphabetic characters.

As shown in the illustrated embodiment, each shot 202 can be created by scoring the content items for each position and then assigning a scored content item with a matching content item index value to the position. For example, each position of the first shot 202 can be assigned the eligible content item with the best score for that position, as illustrated by the assignment of a position index value of "0" to each position. In the illustrated embodiment, each position in a candidate playlist may be assigned sequentially; as a result, the best-scoring content item available for the third position 208 is relatively low-scoring with respect to the best-scoring content items assigned to the first and second positions. In fact, as illustrated by table 200, many of the candidate playlists may feature poorly-scoring content items in the third position 208. However, the third position 210 of shot 212 features a high scoring content item relative to the third position 208 in other shots, due at least in part to the fact that the second position was required to be assigned a scored content item having a content item index value of "1" (i.e., the second-best scoring content item). Therefore, third content item 218 was assigned for the second position of candidate playlist 212, and second content item 216 is available to be re-scored and assigned in the third position 210. As a result, third position 210 may have a much higher score than the third positions 208 of any other shot.

Figure 3:
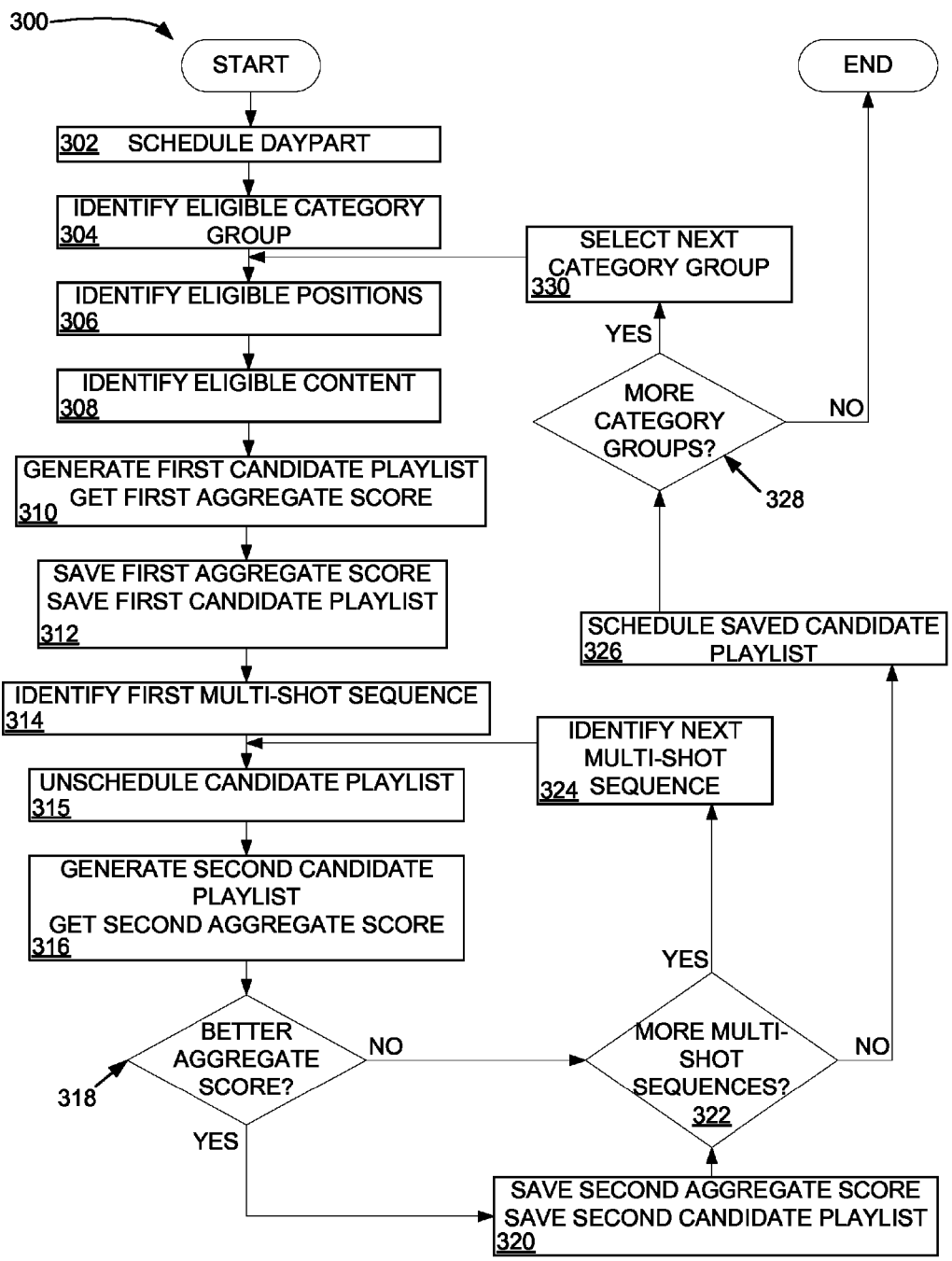
FIG. 3 is a flowchart illustrating a method for utilizing Multi-Shot Scheduling to schedule content items according to various embodiments of the present disclosure.

Referring now to FIG. 3, an embodiment of a method 300 performed by the Multi-Shot Scheduling System is illustrated and discussed. In some embodiments, method 300 may be performed by all or part of the system shown in FIG. 1 and as described in the specification relating to FIG. 1. In some embodiments, method 300 may be utilized to create a table of playlists, as shown in FIGS. 2 and 2A, and as described in the specification relating to FIGS. 2 and 2A. As shown in block 302, method 300 includes scheduling a daypart. A daypart can be, but is not limited to, a broadcast playlist of content items for a period of time. The scheduling of a daypart can be facilitated through the use of an algorithm including, but not limited to, a demand-based goal-driven algorithm.

As shown in block 304, method 300 can include identifying an eligible category group. A category group can include, but is not limited to, a group of content items. For example, a category group could be a genre of content items, a sub-genre, content items by similar artists, or the like. The category group may apply only for a specific daypart, apply across the entire day, or apply for some other period of time. In some embodiments, the eligible category group can be identified as eligible by some property of the category group in relation to the relevant daypart. For example, in an embodiment where the relevant daypart is morning rush hour, only category groups associated with upbeat content items may be identified as eligible. In some embodiments, the eligible category group can be identified as eligible by factors affecting the local area of the broadcast, such as weather, local events, etc.

As shown in block 306, method 300 can include identifying eligible positions. In some embodiments, eligible positions may be distinguished from non-eligible positions by being associated with the first category group. For example, a position may be identified as an eligible position where the position is within the relevant morning rush hour daypart and is dedicated to pop content items, where the identified first category group is pop content items. In some embodiments, some or all of the information regarding positions including, but not limited to, which category groups the positions may be associated, may be stored locally; in some other embodiments, some or all of such information may be stored remotely and subsequently retrieved or received from remote storage.

As shown in block 308, method 300 can include identifying content items eligible for assignment into the eligible positions. In some embodiments, eligibility of a content item may be determined from the content item's association with an eligible position, eligible category, or the like. For example, upbeat content items may be identified as eligible content items due to their association with the category group dedicated to upbeat content items.

As shown in block 310, method 300 can include assigning eligible content items into eligible positions of the daypart using a demand-based goal-driven algorithm to generate a first candidate playlist and getting an aggregate score for the first candidate playlist. This process is discussed in further detail below in FIG. 4. In some embodiments, algorithms other than a demand-based goal-driven algorithm are used. For example, a first candidate playlist may be generated through the use of algorithms that rely solely upon listener feedback data. As shown in block 312, method 300 can include saving the first aggregate score and generated first candidate playlist. In some embodiments, the first aggregate score and first candidate playlist may be "saved" by being stored in part of a memory storage unit in a processing system, as described in further detail in FIG. 6, below.

As shown in block 314, method 300 can include identifying a first Multi-Shot sequence. In some embodiments, some or all of the Multi-Shot Sequence may be stored locally; in some embodiments, some or all of the Multi-Shot Sequence may be stored remotely and is received or retrieved from the remote storage. For example, some or all of the Multi-Shot Sequence may be generated by a remote device. Some or all of the Multi-Shot Sequence may also be generated locally from a set of rules.

As shown in block 315, method 300 can include unscheduling the first candidate playlist scheduled in block 310. In some embodiments, some or all of a candidate playlist may be generated into the daypart, a playlist template, or the like and removed prior to the generation of other candidate playlists in the daypart. For example, some or all of a first candidate playlist may be unscheduled by being deleted from the playlist. Some or all of the first candidate playlist might also be overwritten with data or tagged for overwriting.

As shown in block 316, method 300 can include assigning eligible content items into eligible positions of the daypart using both a demand-based goal-driven algorithm and the Multi-Shot sequence to generate a second candidate playlist and getting an aggregate score for the scheduled candidate playlist. This process is discussed in further detail below in FIG. 5. In some embodiments, algorithms other than a demand-based goal-driven algorithm may be used. For example, some or all of a second candidate playlist may be generated through the use of algorithms that rely solely upon listener feedback data.

As shown in block 318, method 300 can include comparing the first and second candidate playlists to determine whether the second candidate playlist has a better aggregate score than the first candidate playlist. If the second candidate playlist does have a better aggregate score than the first candidate playlist, as shown in block 320, the second aggregate score and the second candidate playlist may be saved. In some embodiments, where the second aggregate score and the second candidate playlist are saved, the first aggregate score and the first candidate playlist may be discarded by being overwritten, deleted, tagged for overwriting, or the like.

As shown in block 322, method 300 can include determining whether or not there are additional Multi-Shot sequences with which to generate candidate playlists. If there are, as shown in block 324, the second candidate playlist may be unscheduled, as shown in block 315, and another candidate playlist can be scheduled and scored, as shown in block 316 and discussed in further detail below in FIG. 5.

In some embodiments, blocks 315, 316, 318, 320, 322, and 324 are repeated in an iterative process loop for as long as there are additional Multi-Shot sequences from which to generate subsequent playlists, as determined by block 322. Each currently or subsequently-generated candidate playlist generated at block 316 in a given iteration of the process loop may be compared against a candidate playlist generated and saved in a previous iteration of the process loop. For example, a candidate playlist generated in a given iteration of the process loop illustrated by blocks 315, 316, 318, 320, 322, and 324 may be compared in block 318 of the current iteration against a candidate playlist generated in block 316 of a previous iteration of the process loop. The previously-generated candidate playlist may be the candidate playlist saved at block 320 in the most recent previous iteration of the process loop, the candidate playlist saved at block 312 in the most recent previous iteration of the process loop, or the like. For example, where the candidate playlist found to be better-scoring at block 318 is saved, and the lesser-scoring candidate playlist is discarded, at block 320, the candidate playlist generated in block 316 of a given iteration of the process loop can be compared against the previously-generated candidate playlist most recently saved in block 320 of a previous iteration including, but not limited to, the most recent previous iteration of the process loop.

In some embodiments, a currently or subsequently-generated candidate playlist that is determined in block 318 of a given iteration of the process loop to have a better aggregate score than a previously-generated candidate playlist replaces the previously-generated candidate playlist. For example, a better-scoring currently-generated playlist may be saved in block 320 by overwriting the saved previously-generated candidate playlist. Alternatively, the currently-generated candidate playlist may be saved, and the previously-generated candidate playlist discarded. Upon being saved in block 320, the currently-generated candidate playlist may become the previously-generated candidate playlist if a subsequent iteration of the process loop occurs such that a subsequent candidate playlist is generated and compared against the previously-generated candidate playlist in block 318. In some embodiments, a currently or subsequently-generated candidate playlist that is determined in block 318 of a given iteration of the process loop to not have a better aggregate score than a previously-generated candidate playlist is discarded, and the previously-generated candidate playlist remains to be compared against any candidate playlist generated in a subsequent iteration of the process loop.

As shown in block 326, method 300 can include scheduling the saved candidate playlist. The saved candidate playlist may be scheduled as a broadcast playlist to be performed as part of a daypart. In some embodiments, only one candidate playlist may be available to be scheduled. For example, where the better candidate playlist is saved and the lesser candidate playlist is discarded, as illustrated by blocks 318 and 320, only the candidate playlist with the best aggregate score of all of the Multi-Shot sequences and the demand-based goal-driven scheduling may remain to be scheduled in block 326. In some other embodiments, multiple candidate playlists are saved, and the candidate playlist with the best aggregate score may be selected to be scheduled. For example, where the lesser of two candidate playlists is not discarded after comparison, as illustrated by block 318 and 320, multiple candidate playlists may be available at block 326, and the best candidate playlist may be selected and scheduled.

As shown in block 328, method 300 can include determining whether additional category groups may be found. In some embodiments, additional category groups may be retrieved or received from different locations as the first category group. For example, while the first category group may be retrieved from local storage, additional category groups may be received from remote storage. If additional category groups are found or received, as shown in block 330, new eligible positions and content items may be identified as illustrated in blocks 306 and 308, and new candidate playlists for the additional category groups can be scheduled, as illustrated by block 326.

Figure 4:
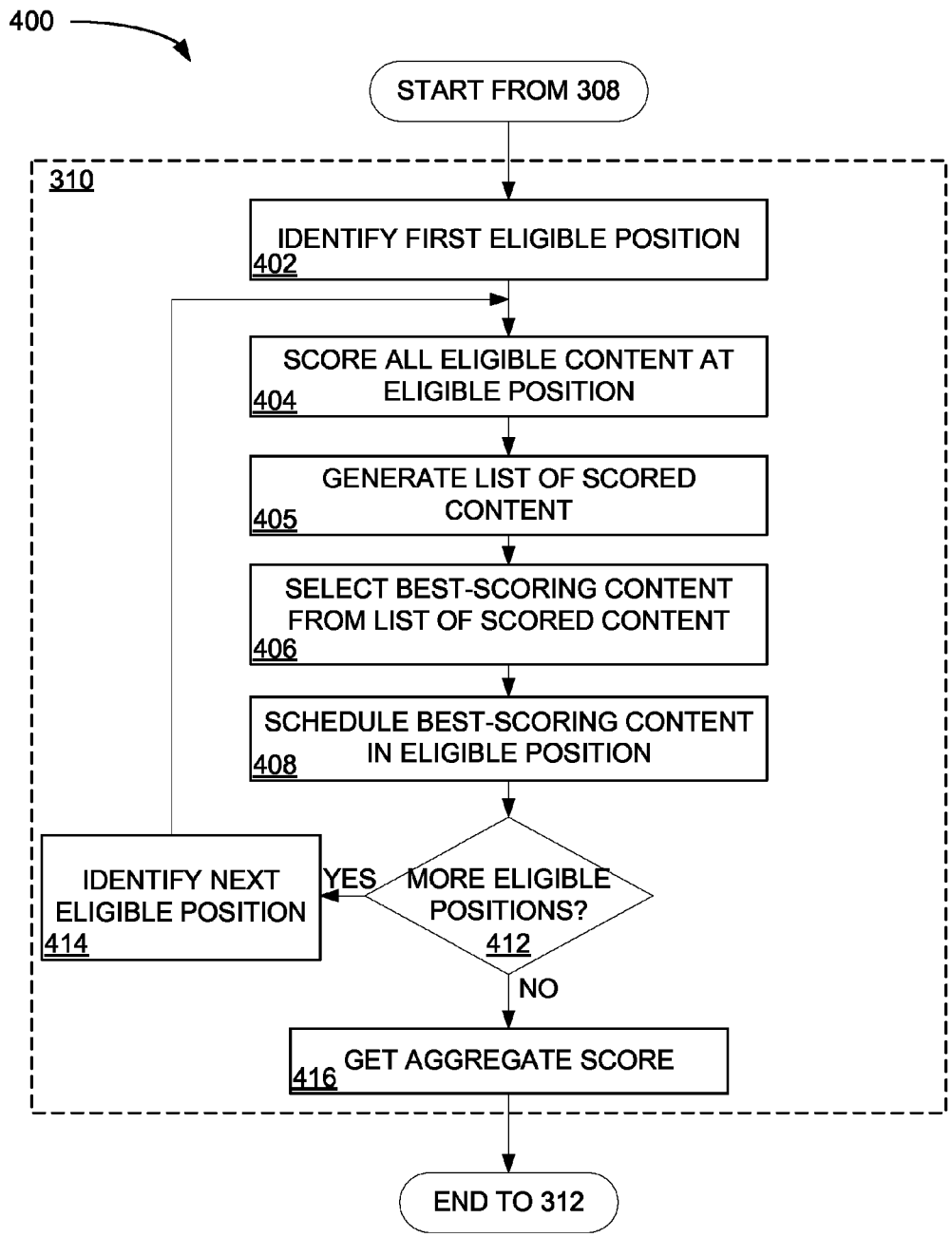
FIG. 4 is a flowchart illustrating a method for generating a candidate playlist according to various embodiments of the present disclosure.

Referring now to FIG. 4, an embodiment of a method 400 performed by the Multi-Shot Scheduling System is illustrated and discussed. Method 400 may be performed at block 310 of method 300, illustrated and discussed in further detail above in FIG. 3, to generate the first candidate playlist and the first aggregate score. As shown in block 402, method 400 can include identifying a first eligible position. In some embodiments, a first eligible position may be distinguishable from all other eligible positions identified in block 306 as illustrated above in FIG. 3. For example, the first eligible position may be the chronologically earliest position in the relevant daypart. In some other embodiments, the first eligible position may be selected via some other logic or no logic at all.

As shown in block 404, method 400 can include scoring all eligible content items at the first eligible position. In some embodiments, each eligible content item may be scored with an algorithm that scores the eligible content item on the basis of its suitability to being assigned in the eligible position. For example, a demand-based goal-driven algorithm may be utilized to score each eligible content item on the basis of its performance with regard to certain predetermined rules and goals if it were assigned in the eligible position. In some embodiments, the scoring of eligible content items may generate a score for each eligible content item. For example, each eligible content item may be given a score that has a numerical value that is directly proportional to the eligible content item's suitability for assignment in the eligible position.

As shown in block 405, method 400 can include generating a list of scored eligible content items. In some embodiments, the list is arranged in accordance with the scores of the scored eligible content items. For example, the list may be arranged to start with the best-scored eligible content item and end with the worst-scored eligible content item. In some embodiments, each scored eligible content item in the list may be assigned a content item index value that is associated with the scored eligible content item's score in comparison with the scores of all the other scored eligible content items in the list. For example, where the index values are "zero based", the best-scored eligible content item in the list may be assigned a content item index value of "0" (zero), the next-best-scored eligible content item may be assigned a content item index value of "1" (one), and so on. In some other embodiments, other characters or representations of index values may be used, including, but not limited to, alphabetic characters, or a combination of numeric and alphabetic characters.

As shown in block 406, method 400 can include selecting the best-scoring content item from the list of scored eligible content items. In some embodiments, the selection may involve selecting whichever eligible content item is assigned a content item index value which indicates that the eligible content item is the best-scoring eligible content item. For example, where the index values are numerical and "zero based", the best-scoring eligible content item in the list may be selected as the eligible content item to which the content item index value "0" (zero) is assigned. As shown in block 408, method 400 can include assigning the selected best-scoring eligible content item in the first eligible position.

As shown in block 412, method 400 can include determining whether additional eligible positions are to be assigned a content item. If there are, as shown in block 414, then method 400 may repeat from block 404 to assign the best-scoring eligible content item in the next eligible position. In some embodiments, method 400 may repeat until there are no eligible positions, at which point, as shown in block 416, the first aggregate score of the first candidate playlist is acquired. In some embodiments, the aggregate score may be calculated as a function of some or all of the individual scores of each eligible content item assigned in each eligible position. For example, the aggregate score may be the sum of all or some of the individual scores of all assigned content items. In some embodiments, the aggregate score may be the average of the individual scores of some or all of the assigned content items. The aggregate score may also, in some other embodiments, represent some metric relating to some or all of the assigned eligible positions in the candidate playlist including, but not limited to, an individual score of a predetermined eligible position, the lowest individual score of an assigned content item in the candidate playlist, or the like.

Figure 5:
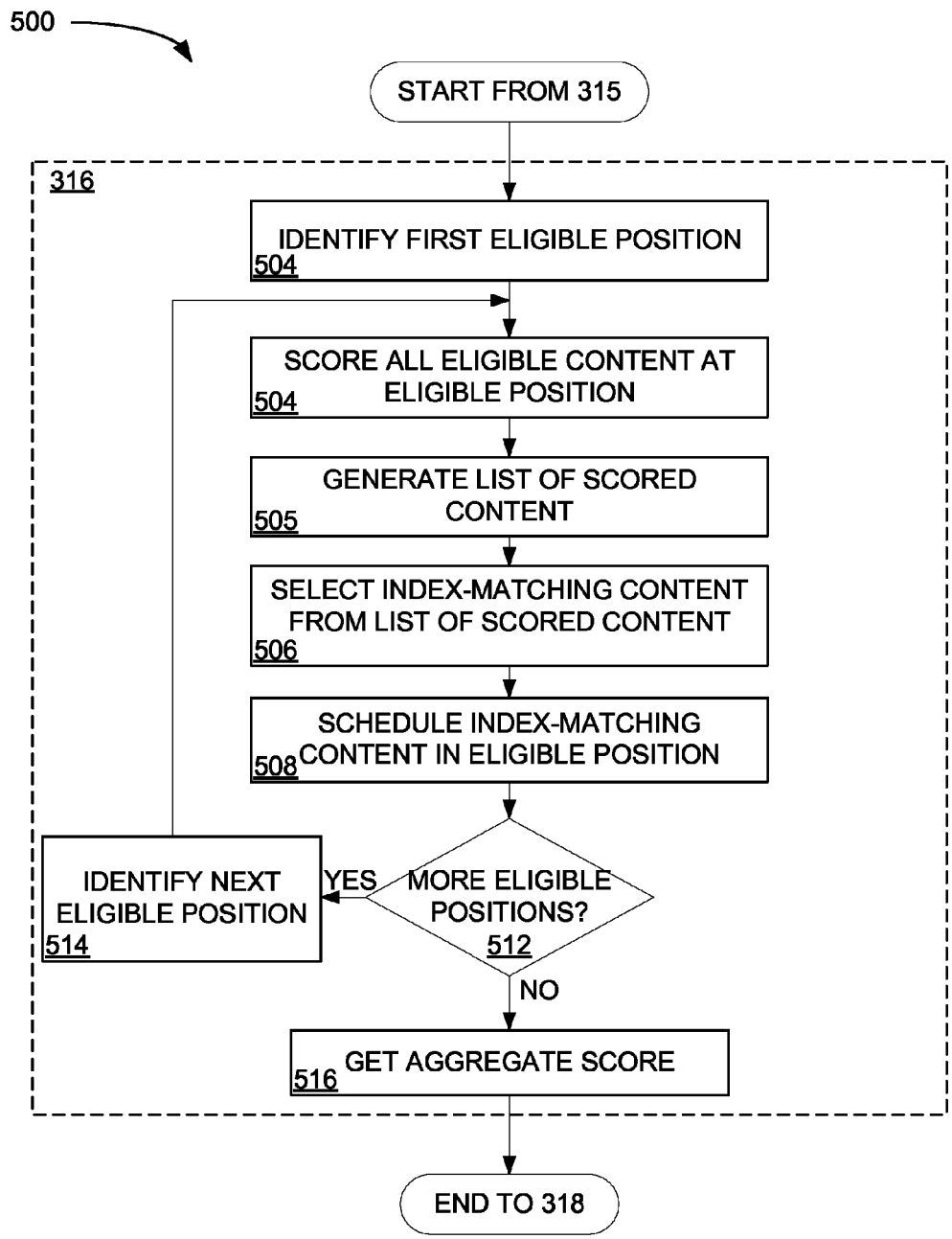
FIG. 5 is a flowchart illustrating a method for generating a candidate playlist according to various embodiments of the present disclosure.

Referring now to FIG. 5, an embodiment of a method 500 performed by the Multi-Shot Scheduling System is illustrated and discussed. Method 500 may be performed at block 316 of method 300, illustrated and discussed in further detail above in FIG. 3, to generate the second candidate playlist and the second aggregate score. As shown in block 502, method 500 can include identifying a first eligible position. In some embodiments, a first eligible position may be distinguishable from all other eligible positions identified in block 306 as illustrated above in FIG. 3. For example, the first eligible position may be the chronologically earliest position in the relevant daypart. In some other embodiments, the first eligible position may be selected via some other logic or no logic at all.

As shown in block 504, method 500 can include scoring all eligible content items at the first eligible position. In some embodiments, each eligible content item may be scored with an algorithm that scores the eligible content item on the basis of its suitability to being assigned in the eligible position. For example, a demand-based goal-driven algorithm may be utilized to score each eligible content item on the basis of its performance with regard to certain predetermined rules and goals if it were assigned in the eligible position. In some embodiments, the scoring of eligible content items generates a score for each eligible content item. For example, each eligible content item may be given a score that is a numerical value and that is directly proportional to the eligible content item's suitability for assignment in the eligible position.

As shown in block 505, method 500 can include generating a list of scored eligible content items. In some embodiments, the list may be arranged in accordance with the scores of the scored eligible content items. For example, the list may be arranged to start with the best-scored eligible content item and end with the worst-scored eligible content item. In some embodiments, each scored eligible content item in the list may be assigned a content item index value that is associated with the scored eligible content item's score in comparison with the scores of all the other scored eligible content item in the list. For example, where the index values are "zero based", the best-scored eligible content item in the list may be assigned a content item index value of "0" (zero), the next-best-scored eligible content item may be assigned a content item index value of "1" (one), and so on. In some other embodiments, other characters or representations of index values may be used, including, but not limited to, alphabetic characters, or a combination of numeric and alphabetic characters.

As shown in block 506, method 500 can include selecting a scored content item from the list by matching the content item index value assigned to a scored content item in the list with a position index value assigned to the eligible position by the Multi-Shot sequence. As discussed above, in some embodiments, each Multi-Shot Sequence may include a unique sequence of position index values for each shot. For example, where there are three eligible positions in a shot, each Multi-Shot Sequence may consist of three position index values, each of which is assigned to one of the eligible positions. Once the matching eligible content item is selected, it can be assigned in the eligible position, as shown in block 508.

As shown in block 512, method 500 can include determining whether additional eligible positions are to be assigned. If there are, as shown in block 514, then method 500 may repeat from block 504 to assign the scored eligible content item that is assigned a content item index value that matches a position index value assigned to the next eligible position. In some embodiments, method 500 may repeat until there are no eligible positions, at which point, as shown in block 516, the second aggregate score of the second candidate playlist is acquired. For example, where a candidate playlist includes three positions, method 500 may run three times. In some embodiments, the second aggregate score may be calculated using the same function used to calculate the first aggregate score in block 416 of FIG. 4, in order to enable comparison of the first and second aggregate scores, as shown in block 318 of FIG. 3.

Figure 6:
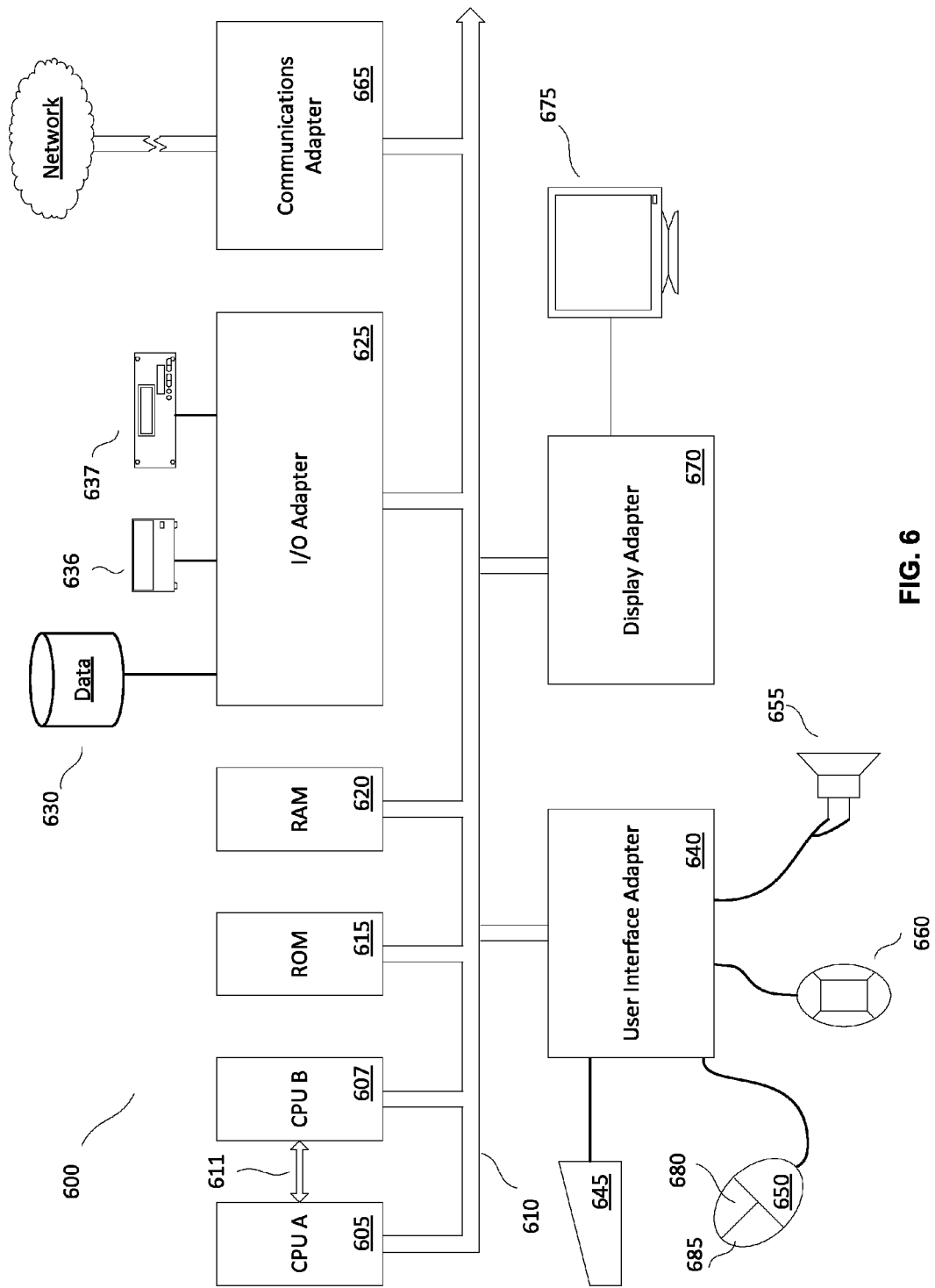
FIG. 6 is a high-level block diagram of a processing system, such as a server, according to various embodiments of the present disclosure.

Referring now to FIG. 6, a high-level block diagram of a processing system is illustrated and discussed. The processing system 600 shown in FIG. 6 may be used in conjunction with any of the systems or processes illustrated in FIGS. 1-5, and described in the specification associated with FIGS. 1-5. Processing system 600 may include one or more central processing units, processing circuitry, or processing circuitry programmed by hardware, such as CPU A 605 and CPU B 607, which may be conventional microprocessors interconnected with various other units via at least one system bus 610. CPU A 605 and CPU B 607 may be separate cores of an individual, multi-core processor, or individual processors connected via a specialized bus 611. In some embodiments, CPU A 605 and/or CPU B 607 may be a specialized processor, such as a graphics processor, other co-processor, or the like.

Processing system 600 may include random access memory (RAM) 620; read-only memory (ROM) 615, wherein the ROM 615 could also be erasable programmable read-only memory (EPROM) or electrically erasable programmable read-only memory (EEPROM); and input/output (I/O) adapter 625, for connecting peripheral devices such as disk units 630, optical drive 636, or tape drive 637 to system bus 610; a user interface adapter 640 for connecting keyboard 645, mouse 650, speaker 655, microphone 660, or other user interface devices to system bus 610; communications adapter 665 for connecting processing system 600 to an information network such as the Internet or any of various local area networks, wide area networks, cellular telephone networks, satellite networks or the like; and display adapter 670 for connecting system bus 610 to a display device such as monitor 675. Mouse 650 may have a series of buttons 680, 685 and may be used to control a cursor shown on monitor 675. It will be understood that processing system 600 may include other suitable data processing systems without departing from the scope of the present disclosure. For example, processing system 600 may include bulk storage and cache memories, which provide temporary storage of at least some program code in order to reduce the number of times code must be retrieved from bulk storage during execution.

Various disclosed embodiments can be implemented in hardware, software, or a combination containing both hardware and software elements. Some embodiments may be implemented in software, which includes but is not limited to firmware, resident software, microcode, etc. Some embodiments may be realized as a computer program product, and may be implemented as a computer-usable or computer-readable medium embodying program code for use by, or in connection with, a computer, a processor, processing circuitry, processing circuitry programmed by hardware, or other suitable instruction execution system. Some embodiments may include the use of an Internet browser. In addition, some embodiments may include the use of a software application that is operable without the use of a browser.

For the purposes of this description, a computer-usable or computer readable medium can be any tangible, non-transitory, medium that can contain, store, communicate, or be used to transport the program for use by or in connection with an instruction execution system, apparatus, or device. By way of example, and not limitation, computer readable media may comprise any of various types of computer storage media, including volatile and non-volatile, removable and non-removable media implemented in any suitable method or technology for storage of information such as computer readable instructions, data structures, program modules, or other data. Computer storage media may include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

It will be understood that the Multi-Shot Scheduling System may include other components, elements, or interfaces without departing from the scope of the present disclosure. Furthermore, although particular embodiments have been discussed above, the invention is not limited to the disclosed embodiments, but may include subject matter encompassed by the scope of the appended claims.

What is claimed is:

1. A method of generating a playlist, the method comprising:
   using a processing circuitry, identifying a first position of a playlist to be scheduled, wherein the first position is associated with a content type, and is assigned a range of allowable position index values;
   using the processing circuitry, identifying first content items eligible for assignment to the first position based, at least in part, on whether the content type associated with the first position matches a content type of the first content items;
   using the processing circuitry, scoring eligible first content items based on suitability for assignment to the first position;
   using the processing circuitry, assigning a content item index value to scored eligible first content items, the content item index value based at least in part on scores of the scored eligible first content items relative to each other; and
   using the processing circuitry, assigning one of the scored eligible first content items to the first position based, at least in part, on whether the content item index value of the one of the scored eligible first content items falls within the range of allowable position index values assigned to the first position.

2. The method of claim 1, comprising:
   identifying a second position of the playlist to be scheduled, wherein the second position is assigned a range of allowable position index values;
   identifying second content items eligible for assignment to the second position;
   scoring eligible second content items based on suitability for assignment to the second position;
   assigning a content item index value to scored eligible second content items; and
   assigning one of the scored eligible second content items to the second position based, at least in part, on whether the content item index value of the one of the scored eligible second content items falls within the range of allowable position index values assigned to the second position.

3. The method of claim 2, wherein at least one of the eligible first content items is also included in the plurality of eligible second content items, the method further comprising:

assigning the at least one of the eligible first content items a first content item index value during scheduling of the first position of the playlist, and a different content item index value during scheduling of the second position.

4. The method of claim 1, further comprising:

identifying a plurality of first positions in a plurality of playlists, at least two of the plurality of first positions having different ranges of allowable position index values; and assigning content items selected from the first content items to each of the first positions in the plurality of playlists based, at least in part, on a comparison of content item index values associated with the content items selected, and position index values associated with the first positions.

5. The method of claim 1, wherein different groups of content items are eligible for assignment to different positions of the playlist.

6. The method of claim 1, wherein the playlist is associated with a daypart, and eligibility for assignment to the first position is determined based, at least in part, on suitability of a content item for broadcast during the daypart.

7. The method of claim 1, wherein scoring a particular eligible first content item includes estimating a performance of the particular eligible first content item, assuming the particular eligible first content item were to be assigned to the first position.

8. A device comprising:
a processing circuitry;
a memory operably associated with the processing circuitry, the processing circuitry, and memory operable to generate a candidate playlist by selecting a content item for assignment to each position of a candidate play list based on both:
position index values assigned to each position in the candidate play list, and
a content item index value associated with particular content items and determined, at least in part, based on a score related to suitability of the particular content items for assignment to each position of the candidate playlist.

9. The device of claim 8, the processing circuitry and memory further operable to:
score content items based on suitability for assignment to particular positions in the candidate playlist; and
generate a content item index value for a particular content item based, at least in part, on a comparison of the score associated with the particular content item to the scores associated with other content items.

10. The device of claim 9, the processing circuitry and memory further operable to:
score a first group of content items based on suitability for assignment to a first position of the candidate playlist; and
score a second group of content items, different from the first group of content items, based on suitability for assignment to a second position of the candidate playlist.

11. The device of claim 8, the processing circuitry and memory are further operable to generate a plurality of candidate playlists by selecting a content item for assignment to each position of each candidate playlist based on both:
position index values assigned to each position in each candidate play list, and
a content item index value associated with particular content items and determined, at least in part, based on a score related to suitability of the particular content items for assignment to each position of the candidate playlist.

12. The device of claim 11, wherein a same group of content items are evaluated for assignment to corresponding positions in the plurality of candidate playlists.

13. The device of claim 8, wherein the candidate playlist is associated with a daypart, and content items are determined to be eligible for assignment to a particular position in the candidate playlist based, at least in part, on suitability of the content item for broadcast during the daypart.

14. The device of claim 8, wherein the score is determined, at least in part, by estimating a performance of a particular content item, assuming the particular content item were to be assigned to a particular position in the candidate playlist.

15. A method of generating a playlist, the method comprising:
using a processing circuitry, assigning position index values to each of a plurality of positions included in the playlist;
using the processing circuitry, assigning a plurality of content index values to each of a plurality of content items being considered for assignment to the plurality of positions, the content index value being position dependent; and
using the processing circuitry, assigning one of the plurality of content items to each position based, at least in part, on the position index values and the content index values.

16. The method of claim 15, further comprising:
scoring content items based on suitability for assignment to particular positions in the playlist; and
generating a content index value for a particular content item based, at least in part, on a comparison of a score associated with the particular content item to scores associated with other content items.

17. The method of claim 16, further comprising:
scoring a first group of content items based on suitability for assignment to a first position of the playlist; and
scoring a second group of content items, different from the first group of content items, based on suitability for assignment to a second position of the playlist.

18. The method of claim 15, further comprising:
generating a plurality of candidate playlists by selecting a content item for assignment to each position of each candidate playlist based on both:
position index values assigned to each position in each candidate play list, and
a content item index value associated with particular content items and determined, at least in part, based on a score related to suitability of the particular content items for assignment to each position of the candidate playlist.

19. The method of claim 18, wherein a same group of content items are evaluated for assignment to corresponding positions in the plurality of candidate playlists.

20. The method of claim 15, wherein the playlist is associated with a daypart, and content items are determined to be eligible for assignment to a particular position in the playlist based, at least in part, on suitability of the content item for broadcast during the daypart.

* * * * *